Figure 1:
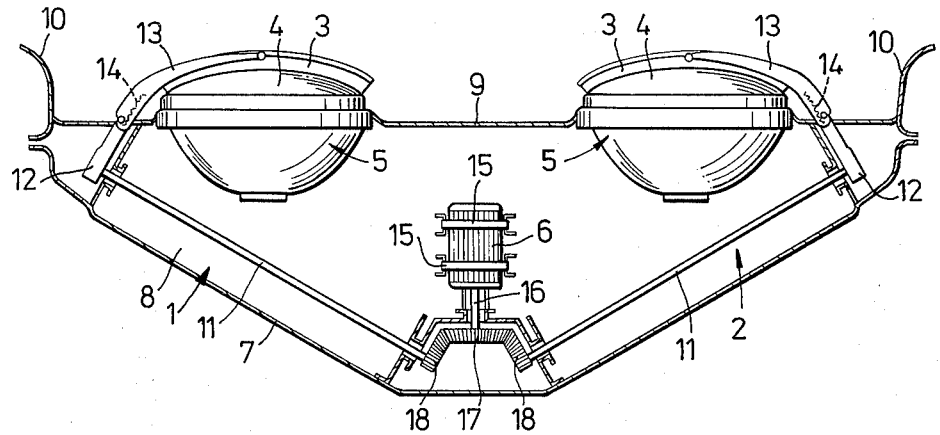

United States Patent [19]

Söderberg

[11] 3,914,819

[45] Oct. 28, 1975

[54] WIPER DEVICE FOR HEADLIGHTS IN VEHICLES

[75] Inventor: Tage Ernst Söderberg, Stockholm, Sweden

[73] Assignee: Saab-Scania Aktiebolag, Sodertalja, Sweden

[22] Filed: July 9, 1973

[21] Appl. No.: 377,186

[30] Foreign Application Priority Data

July 13, 1972 Sweden................................ 9219/72

[52] U.S. Cl. ............ 15/250.27; 15/250 A; 15/250.3
[51] Int. Cl.² ........................................... B60S 1/26
[58] Field of Search ................. 15/250.01–250.04, 15/250.3, 250.27, 250.23, 250 A

[56] References Cited
UNITED STATES PATENTS

| | | |
|---|---|---|
| 2,045,128 | 6/1936 | Dykstra............................ 15/250.27 |
| 2,121,815 | 6/1938 | Morrison ....................... 15/250.3 X |
| 2,359,553 | 10/1944 | Fuller............................... 15/250.30 |
| 2,450,692 | 10/1948 | Sacchini et al. ................ 15/250.3 X |
| 3,832,751 | 9/1974 | Ursel et al. ....................... 15/250.23 |
| 3,837,036 | 9/1974 | Burger et al..................... 15/250.23 |

*Primary Examiner*—Peter Feldman
*Attorney, Agent, or Firm*—Cushman, Darby & Cushman

[57] ABSTRACT

The present invention relates to a wiper device for pairmounted headlights having each an essentially cap-shaped cover glass. To each headlight belongs a wiper arm which is provided with a wiper blade and is mounted on an oscillating drive axle, each of which extends axially through the geometric centre of a contour-defining exterior surface for the respective cover glass. The drive axles are imparted oscillating movements via toothed transmission gear means.

5 Claims, 3 Drawing Figures

U.S. Patent  Oct. 28, 1975  3,914,819

WIPER DEVICE FOR HEADLIGHTS IN VEHICLES

The present invention relates to a wiper device for headlights mounted in pairs in or on the body of a vehicle.

The need for cleaning devices for vehicle headlights has increased due to the fact that roads during the winter have begun to be salted, and due to the fact that studded tires have come into use to a greater extent. The tire studs tear loose asphalt particles and adhesives which become mixed with the road salt, creating a sludge which in heavy traffic conditions quickly reduces the efficiency of the headlights.

In order to eliminate the abovementioned disadvantage it is known to equip vehicles with washing devices for the headlight glasses, but these washing devices have shown to be ineffective, since they are not capable of removing the splashed on salt sludge sufficiently well. For this reason it has recently become known to construct headlight cleaning devices comprising both washing and wiping devices. For round headlights, however, it is difficult to make a simple and effective construction for a wiper device. Known solutions generally have a wiper blade equipped wiper arm that is attached to a drive axle which is rotatably journalled in a support extending through the centre of the cover glass of the headlight or which is journalled on a supporting arm in front of the cover glass and is attached to the body. Installations of this type are complicated and expensive and also involve a reduction of the flow of light from the headlights and a risk of creating shadows on the road. The lastmentioned disadvantages are also inherent in all other wiping devices which with rotatable or otherwise slidable wiper means are disposed to lie permanently in contact with the respective headlight cover glass.

Previously known solutions for eliminating these disadvantages with oscillating wiper arms have disadvantageous designs and consequently have poor cleaning capability. The contact of the wiper blades with the respective cover glass as well as the wiping effect of the wiper blades varies too much depending on their relative positions on the cover glasses during a wiping operation. The reason for this is that as a rule the cover glass has a curved shape. When not paying sufficient attention to this fact, the wiper blade on a wiper arm rotatably mounted in a usual manner in the body at the side of a headlight, therefore has varying contact pressure against the cover glass during angular motion of the wiper arm.

Consequently the placement of the drive axle is of extreme importance for the dynamics of motion of the wiper arm, and to obtain the optimum wiping effect it is therefore necessary to adjust the position of the drive axle geometrically, depending on the exterior shape of the cover glass. In view of this the present invention relates to a wiper device for pair mounted headlights in or on the body of a vehicle, said wiping device comprising for each headlight a wiper arm, equipped with an elastic wiper blade. Said arm is attached to a drive axle situated outside the respective headlight and is disposed to lie resiliently in contact with the cover glass of the headlight in question and is made to move with oscillating rotary movements over the cover glass by the effect of a drive means common for two headlights situated close to each other. The drive means is preferably a reversible electric motor attached between two headlights. The device according to the invention is essentially characterized in that the wiper device comprises two rotatably journalled drive axles each of which is axially extending through the geometric centre of a contour-defining exterior form for the respective cover glass and in that the drive axles are imparted back and forth rotary movements by the drive means with the help of toothed transmission means.

The drive axles are preferably rotatably journalled inside a rear, mountable casing, which contains the headlights, and constitutes a headlight casing. Said casing preferably also encloses the drive motor of the wiper device, thereby making possible a compact installation with great accessability.

The purpose of the present invention is to achieve with simple components, a moment equalizing wiping function where the wiper blade is only subjected to that resistance which might be caused by a layer of dirt spread over the surface of the cover glass. This means that the wiper blade will have a longer life and that the cleaning of the cover glass will be even over the entire surface.

Figure 2:
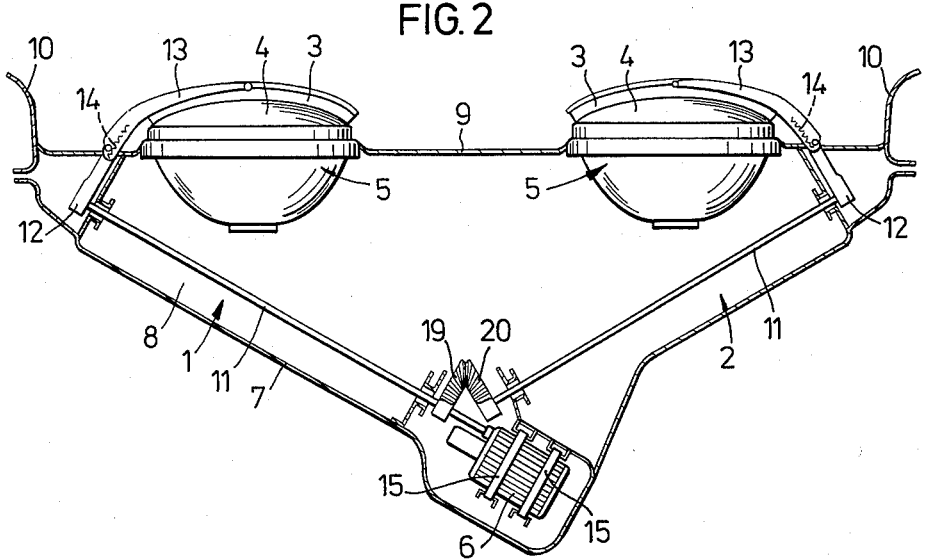
Figure 3:
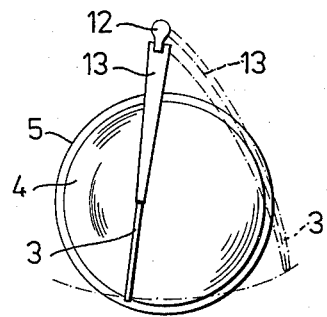

The invention will be described below with reference to the enclosed Figures, of which FIG. 1 shows schematically a wiper device according to the idea of the invention for paired double headlights in a vehicle, FIG. 2 shows a modified construction of a similar wiper device and FIG. 3 shows a headlight seen from the front.

The wiper device according to the present invention is designed for permanent installation close to the headlights in a vehicle. In the construction exemplified in FIG. 1 the wiper device comprises the combination of two wiper mechanisms 1 and 2, working in conjunction, each of which has a wiper blade 3 of elastic material lying against the surface of a cover glass 4 of a headlight 5. The wiper device is driven by a reversible electric motor 6 common to both mechanisms 1 and 2, the respective wiper blade 3 being imparted oscillating rotary movements on the cover glass 4 of the headlight 5. In the embodiments illustrated in FIGS. 1 and 2 the wiper mechanisms 1 and 2 and the drive motor 6 of the wiper device are mounted in a headlight housing, which is located in a front body space in a vehicle and contains the headlights 5. The headlight housing is bounded by a lower and an upper wall plate 7 and 8 and by a front cover plate 9 provided with openings for each headlight 5. The wall plates 7 and 8 and the cover plate 9 are attached to the vehicle body 10 with screws (not shown) or similar fasteners which make possible quick assembly and disassembly of the headlight housing during installation and service.

Each wiper mechanism 1 and 2 comprises a drive axle 11, which in the wiper device shown in FIG. 1 is disposed to be driven via a gear 17,18 by the output shaft of the motor 6. The wiper device is designed to require a minimum of mounting space in the vehicle. For this reason the electric motor 6 is attached to the wall plate 8 in the free space between the headlights 5. The motor is joined with the help of two U-bolts 15, to a number of supporting brackets securely attached to the upper wall plate 8. A bevel gear wheel 17 is attached to the output shaft 16 of the motor 6, said gear wheel engaging toothed segments 18 attached to the inner end of the respective drive axle 11. Each of the drive axles 11 is journalled in brackets securely attached to the wall plates 7,8 of the headlight housing. Said brackets are preferably provided with open support grooves which, when the wall plates 7,8 are being mounted, both are made to hold the respective drive axle 11 and fix it in place.

On the outer end of each drive axle 11 is attached a crank arm 12, which goes through an open groove in the cover plate 9 and comes out by the side of a headlight 5 in a diametrical plane of the same. On the crank arm 12, there is pivotably mounted a wiper arm 13, at the outer end of which a wiper blade 3 is pivotably mounted with attachment in the middle in a manner which is known per se. The wiper arm 13 is normally acted on by a helical spring 14, which is attached to the crank arm 12, and which presses the wiper blade 3 into contact with the cover glass 4 of the headlight 5. The construction is conventional and results in the wiper blade 3 lying flexibly against the cover glass 4. Also, the wiper arm 13 can be turned up to an off-position, in which the helical spring 14 acts on the wiper arm 13 in a rotary direction opposite to the normal one, thus bringing the arm 13 against a stop (not shown) on the crank arm 12, leaving the cover glass 4 and the headlight 5 completely feee.

The wiper blade 3 and possibly also the wiper arm 13 can be made of a flexible material so that in the respective turning positions of the wiper device the wiping means, as a result of the surface friction are bent backward, seen in the direction of motion. In this way (see FIG. 3) the angular deflection is limited and damage to the wiper means is avoided when they touch the conventional framing of the headlights 5 in the body 10.

FIG. 2 shows an alternative embodiment of the wiper device according to the invention with the electric motor 6 mounted in an extra space arranged in the headlight housing. This extra space may be formed by a depressed portion of the wall plate 7, to which the motor 6, in the same manner as previously, is attached to permanently mounted support brackets by means of two U-bolts 15. In this embodiment, one of the drive axles 11 of the wiper mechanism is, directly or indirectly via a coupling (not shown), made up of the output shaft of the motor. In order to drive the other wiper mechanism 2 a bevel gear wheel 19 or toothed segment mounted on the motor axle engages a bevel gear wheel 20 or toothed segment securely mounted on the inner end of the drive axle 11 of said wiper mechanism. The other means and functions are identical to the previously described wiper device according to FIG. 1. Within the scope of the invention the placement of the drive motor and the transmission to the respective drive axles 11 can be modified in still other embodiments, just as it is also possible to drive the drive axles 11 with the help of other drive means.

According to the idea of the invention each wiper mechanism 1 or 2 is constructed to transfer the rotary movements of the motor 6 so that the wiper blade 3 has an almost constant contact pressure against the cover glass 4 during a back and forth rotary movement. For this reason the drive axle 11 in each individual wiper mechanism 1 or 2 is so disposed that its lengthwise axis passes through the geometric centre of the spherically curved surface of the cover glass 4, and furthermore, the wiper arm 13 is constructed with such a radius of curvature that it essentially conforms to said surface. The construction eliminates extreme shear strains on parts of the wiper mechanism 1 or 2 and the wiper blade 3 is thereby imparted an optimal wiping movement.

In an additional alternative (not shown) to the embodiments mentioned, an electric motor 6 is arranged for each headlight 5. The rear part of the casing for each individual headlight is provided with two permanently mounted support brackets, to which the motor is securely fastened with the help of two U-shaped holders 15 or similar fastening means. The drive axle 11 in said case is the output shaft of the motor 6. A line extending axially from said axle goes through the geometric centre of the spherically curved surface of the cover glass 4. The crank arm 12, in the same manner as in the preceding description, is disposed on the outer end of the drive axle 11, and the wiper arm 13 with the wiper blade 3 also have the previously described construction. The lastmentioned alternative construction eliminates a common headlight housing with wall plates 7,8 and support brackets included therein, and it also eliminates the need for special spaces in the body in those cases where the spaces available for the headlights are also large enough for the wiper devices in question.

The drive motor 6 in the described embodiments of the wiping device according to the invention is reversible, which means that the output shaft 16 of the motor 6 intermittently runs in alternating directions so that the wiper blade 3 with limited rotary movements is made to oscillatingly sweep the surface of the cover glass 4 of the headlight 5. The motor 6 is coupled in a common manner to the electrical system of the vehicle (not shown) and with a switch in its feeder circuit the motor 6 and consequently the wiper device can be switched on and off, said switch being preferably placed conveniently on the instrument panel of the vehicle.

Although not previously mentioned in the description the wiper device according to the invention can be advantageously combined with a washing device which can on the one hand be switched on automatically when the wiper device is switched on and can on the other hand be operated completely separately independent of the wiping process.

What I claim is:

1. Wiper device for pairmounted headlights having each an essentially cap-shaped cover glass in or on the body of a vehicle, said wiper device comprising for each headlight a wiper arm equipped with an elastic wiper blade, which wiper arm, with attachment on a drive axle outside the respective headlight, is disposed to resiliently lie in contact with the cover glass of the headlight in question and to be imparted oscillating rotary movements over the same under the effect of a drive means common for two headlights which lie close to one another, said motor being preferably a reversible electric motor mounted between two headlights, characterized in that the wiper device comprises rotatably journalled drive axles, each of which extends axially through the geometric centre of a contour-defining exterior surface for the respective cover glass, said drive axles converging in the direction towards said drive means and being symmetrically arranged with regard to said headlights, said drive means and drive axles being situated inside a sealed casing constituting a headlight housing containing the headlights, said casing being located rear of the headlights and being arranged to be mounted on a vehicle.

2. Wiper device according to claim 1, characterized in that the transfer of movement to the drive axles for two headlights lying close to one another is done by means of a toothed transmission gear between the output shaft of the motor and at least one of the drive axles.

3. Wiper device according to claim 2, characterized in that the toothed transmission gear consists of a bevel gear wheel on the output shaft of the drive motor and a gear or toothed segment on each drive axle working in conjunction with said bevel gear wheel.

4. Wiper device according to claim 1, characterized in that the drive axle for a wiper arm is the output shaft of the drive motor.

5. Wiper device according to claim 1, characterized in that the drive motor for each individual wiper mechanism is attached to permanently mounted support brackets on the rear part of the casing of each individual headlight.

* * * * *